(12) United States Patent
Kruy et al.

(10) Patent No.: US 7,370,040 B1
(45) Date of Patent: May 6, 2008

(54) SEARCHING WITH ADAPTIVELY CONFIGURABLE USER INTERFACE AND EXTENSIBLE QUERY LANGUAGE

(75) Inventors: Steven J. Kruy, Carnation, WA (US); Christopher G. Kaler, Redmond, WA (US); Kenneth D. Hardy, Redmond, WA (US); Jomo Ahab Fisher, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 09/717,588

(22) Filed: Nov. 21, 2000

(51) Int. Cl.
*G06F 7/00* (2006.01)
(52) U.S. Cl. .......................................... 707/4; 707/102
(58) Field of Classification Search ............ 707/3, 707/4, 102, 10, 100, 2, 5, 101, 103 R, 103 X, 707/103 Y, 103 Z, 104.1; 345/968; 715/700, 715/744, 762, 507, 508
See application file for complete search history.

(56) References Cited

U.S. PATENT DOCUMENTS

| | | | | |
|---|---|---|---|---|
| 5,596,744 | A * | 1/1997 | Dao et al. ...................... | 707/10 |
| 5,778,358 | A * | 7/1998 | Blackman et al. .............. | 707/3 |
| 5,787,418 | A * | 7/1998 | Hibbetts et al. ................ | 707/4 |
| 5,826,256 | A * | 10/1998 | Devanbu ........................ | 707/4 |
| 5,842,203 | A * | 11/1998 | D'Elena et al. ................. | 707/4 |
| 5,920,866 | A * | 7/1999 | Crim ........................... | 707/100 |
| 5,950,190 | A * | 9/1999 | Yeager et al. .................. | 707/3 |
| 6,141,659 | A * | 10/2000 | Barker et al. ................ | 707/102 |
| 6,272,495 | B1 * | 8/2001 | Hetherington .............. | 707/101 |
| 6,356,286 | B1 * | 3/2002 | Lawrence ................... | 345/853 |
| 6,356,906 | B1 * | 3/2002 | Lippert et al. ................ | 707/10 |
| 6,466,940 | B1 * | 10/2002 | Mills .......................... | 707/102 |
| 6,507,856 | B1 * | 1/2003 | Chen et al. ................. | 715/513 |
| 6,928,443 | B1 * | 8/2005 | Giambalvo ................... | 707/10 |
| 6,938,041 | B1 * | 8/2005 | Brandow et al. ............. | 707/10 |
| 2005/0192953 | A1 * | 9/2005 | Neale et al. .................... | 707/4 |

OTHER PUBLICATIONS

Soffer et al., Pictorial Query Trees for Query Specificatio in Image Databases, Pattern Recognition, 1998. Proceedings. Fourteenth International Conference on Publication Date: Aug. 16-20, 1998, pp. 919-921 vol. 1.*

(Continued)

*Primary Examiner*—Greta L Robinson
(74) *Attorney, Agent, or Firm*—Woodcock Washburn LLP

(57) ABSTRACT

Most search engines include user interfaces and query languages which are tailored for use with specific file types. Thus, a user interface for searching one type file can be quite different than an interface for searching another file type. Disparate user interfaces are troublesome since users must continually reorient themselves as they switch from interface to interface to initiate searches for different file types. Additionally, many of these user interfaces use different query languages and structures, which are not generally adaptive to new file types and query language features. Accordingly, the present inventors developed an adaptively configurable user interface to facilitate a common user experience across two or more databases and an extensible common query structure to allow expansion of a query language to meet the demands of new file types. An exemplary embodiment includes a discovery mechanism for determining query properties of search providers, thereby facilitating adaptive configuring of a user interface to expose the determined query properties. An exemplary embodiment of the user interface includes a portion which remains relatively constant across two or more search providers to reduce user disorientation.

24 Claims, 7 Drawing Sheets

OTHER PUBLICATIONS

Cimino, C. et al., "Interactive Query Workstation: Standardizing Access to Computer-Based Medical Resources", *Computer Methods and Programs in Biomedicine*, 1991, 35, 293-299.

Domenig, R. et al., "A query based approach for integrating heterogeneous data sources", *Proceedings of the Ninth International Conference on Information and Knowledge Management*, 2000, 453-460.

Ferrara, F.M. et al., "The KIM Query System. An Iconic Interface for the Unified Access to Distributed Multimedia Databases", *SIGCHI Bullentin*, 1994, 26(3), 30-39.

Jamison, D.C. et al., "An extensible network query unification system for biological databases", *Computer Applications in the Biosciences*, 1996, 12(2), 145-150.

* cited by examiner

US 7,370,040 B1

SEARCHING WITH ADAPTIVELY CONFIGURABLE USER INTERFACE AND EXTENSIBLE QUERY LANGUAGE

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyright whatsoever. The following notice applies to this document: Copyright© 1999, Microsoft, Inc.

TECHNICAL FIELD

The present invention concerns data stores, graphical user interfaces, and query languages, particularly, interfaces and query languages.

BACKGROUND

Data stores, or more particularly databases, generally store files of various forms or structures. Search programs, sometimes called search engines, allow users to use a query language to identify and retrieve these files or specific portions of files based on content-based search criteria.

Although search engines and query languages have conventionally been focused on text files, recent years have seen an increasing need to search other file types, particularly in software development contexts. Seminal examples of file types in the development context include bugs, links, and components. A bug is an abstract data element that refers to a problem report, malfunction, defect, or other related issue regarding software code. A link is a data element identifying a logical association between two or more other data elements or objects, for example two or more duplicate or dependent bugs. Component-type files generally include re-useable software objects, including, for example, binary code, HTML code, source code, and so forth.

Each of these file types often requires a specialized search engine, because they are disparate in form, content, and attributes, they are often stored in different databases, and users have different needs when searching these files than typical text files. Moreover, many of these search engines have a unique graphical user interface tailored to search its associated file types. Thus, for example, a user interface for searching bug files generally includes an arrangement of input fields, which is entirely different than those in an interface for searching component files. Because of their disparate input-field arrangements, these unique user interfaces force users to continually reorient themselves as they switch from interface to interface to initiate searches for desired files of different types.

Some interfaces, particularly OLE DB (Object Linking and Embedding Database) interfaces, provide a measure of commonness or congruence across distinct databases. However, these are limited to defining keyword searches, leaving the bulk of the disparate-interface problem unsolved.

Additionally, many of these user interfaces use different query structures, with each query structure optimized for a particular file type. To address this problem, many databases and associated search engines have begun "speaking" a common query language, known as SQL, which reduces the need for users to understand multiple query languages and formats. Although SQL (frequently read and pronounced as "se-kwel") has a broad range of query properties for searching many file types, its universe of properties and types cannot be readily expanded. Thus, any given version of SQL cannot adapt to search new file types that would require or benefit from new query-language features or properties.

Accordingly, the present inventors identified an unmet need for adaptively configurable user interfaces for searching different types of data stores and an unmet need for a readily extensible or expandable query language.

SUMMARY

To address these and other problems, the inventors developed an adaptively configurable user interface to facilitate a common user experience across two or more data classes and an extensible common query structure to allow expansion of a query language to meet the demands of new data classes. An exemplary embodiment of the adaptively configurable interface includes a constant portion with one or more input fields (for example, team name, work area, data type, and folder) and an adaptive portion which changes to meet query properties communicated by particular search providers. Once a query is input, the adaptive interface translates it into a common parse tree, which it passes to one or more of the search providers. Which, in turn, map the parse tree onto their own particular query structures before processing. (Some embodiments pass the query in text form to the search providers.)

An exemplary embodiment of the extensible query structure includes a discovery mechanism for determining whether a database supports or requires use of non-standard query operators and value types. Thus, rather than making assumptions about the query language of a search provider, the exemplary embodiment communicates with the search provider to determine what language-features it supports, allowing the search provider to extend any existing query language or to provide an entirely unique query language for its particular data or file types.

Other notable functionality includes transfer (via email, for example) of queries or partial queries to other users, and storage of queries or partial queries in a team repository for reuse.

In one aspect of the present invention, a method of operating a system including two or more search providers and a user interface is provided, the method including receiving information regarding one or more query properties from one or more of the search providers; and configuring at least a portion of the user interface based on one or more of the received query properties. The information regarding one or more query properties can include receiving information regarding one or data object properties, one or more comparison operators, and one or more operands for each of the one or more comparison operators. In this aspect, configuring at least a portion of the user interface based can include defining and displaying one or more input fields for one or more of the received query properties.

In another aspect of the present invention, the system includes two or more search providers and a user interface having a first input region and a second input region, where the method of operation involves receiving information regarding one or more query properties from one or more of the search providers and configuring at least a portion of the second input region of the user interface based on one or more of the received query properties. Then, user input is received through the user interface to define a query, the query is parsed to define a parse tree; the parse tree is passed to at least one of the search providers, the parse tree is transformed based on the query properties of one of the search providers, and a search is conducted based on the transformed parse tree. In this aspect, passing the parse tree to at least one of the search providers could include passing the parse tree by value to one of the search providers. Further, the method could also include electronically transferring at least a portion of the query to one or more other users, and/or copying at least a portion of the query to a repository for use by other users.

In another aspect of the present invention, the method includes receiving a signal indicating invocation of a search or find command, displaying a first part of a graphical user interface in response to receiving the signal, receiving information regarding one or more query properties from one or more search providers, and displaying a second part of the graphical user interface based on the received information regarding the one or more query properties.

In another aspect of the present invention, the method includes obtaining information regarding query definition forms for one or more search providers, defining a graphical user interface based on the obtained information regarding query definition forms for at least the one search provider.

In another aspect of the present invention, an extensible search architecture for a computer system is provided, that includes a graphical user interface, two or more search providers, and an interface coupled between the two or more search providers and the graphical user interface and adapted to communicate information regarding query definition forms from one or more of the search providers to the graphical user interface or information regarding one or more queries from the graphical user interface to the search providers.

In another aspect of the present invention, a computer readable medium having executable instructions encoded thereon is provided, the computer readable medium including a plurality of search providers, each adapted to search at least one data store using a supported set of search operators and a supported set of search fields, a configurable user interface having two or more interface elements which allow construction of a query using any of the set of supported search operators and search fields from any of the plurality of search providers, and a search application program interface between the configurable user interface and the plurality of search providers, the search application program interface adapted to provide information regarding the supported set of search operators and search fields for each of the search providers so that the user interface can be configured to allow access to search operators and search fields supported by any of the plurality of search providers. In this aspect, the one or more portions of the search providers, the user interface, and/or the search application program interface could be implemented in accord with COM. Or, one or more of the search providers could be implemented in an object-oriented programming language, or adapted to search two or more data stores. The plurality of search providers could also include a first search provider for searching bug files, a second search provider for searching link files, and a third search provider for searching software component files. In another aspect of the present invention, a method of operating a graphical user interface for defining queries is provided, the method including receiving user input defining at least a portion of a query, through a table-style interface window, and displaying a diagrammatic-style or keyword-style interface window based on the query. Or, the method could include displaying a query in a form of a diagram or a table within a first window of the graphical user interface, and displaying the query in a different form within a second window of the graphical user interface.

DRAWINGS

DETAILED DESCRIPTION

The following detailed description, which references and incorporates the drawings, describes and illustrates one or more exemplary embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

The description includes three sections. The first describes an exemplary computer system environment for the invention. The second describes exemplary search system architecture, an exemplary method of operation, and exemplary user interface structures, all embodying various aspects of the invention. The third and concluding section summarizes some features and advantages of the exemplary embodiments.

1. Exemplary Environment

Figure 1:
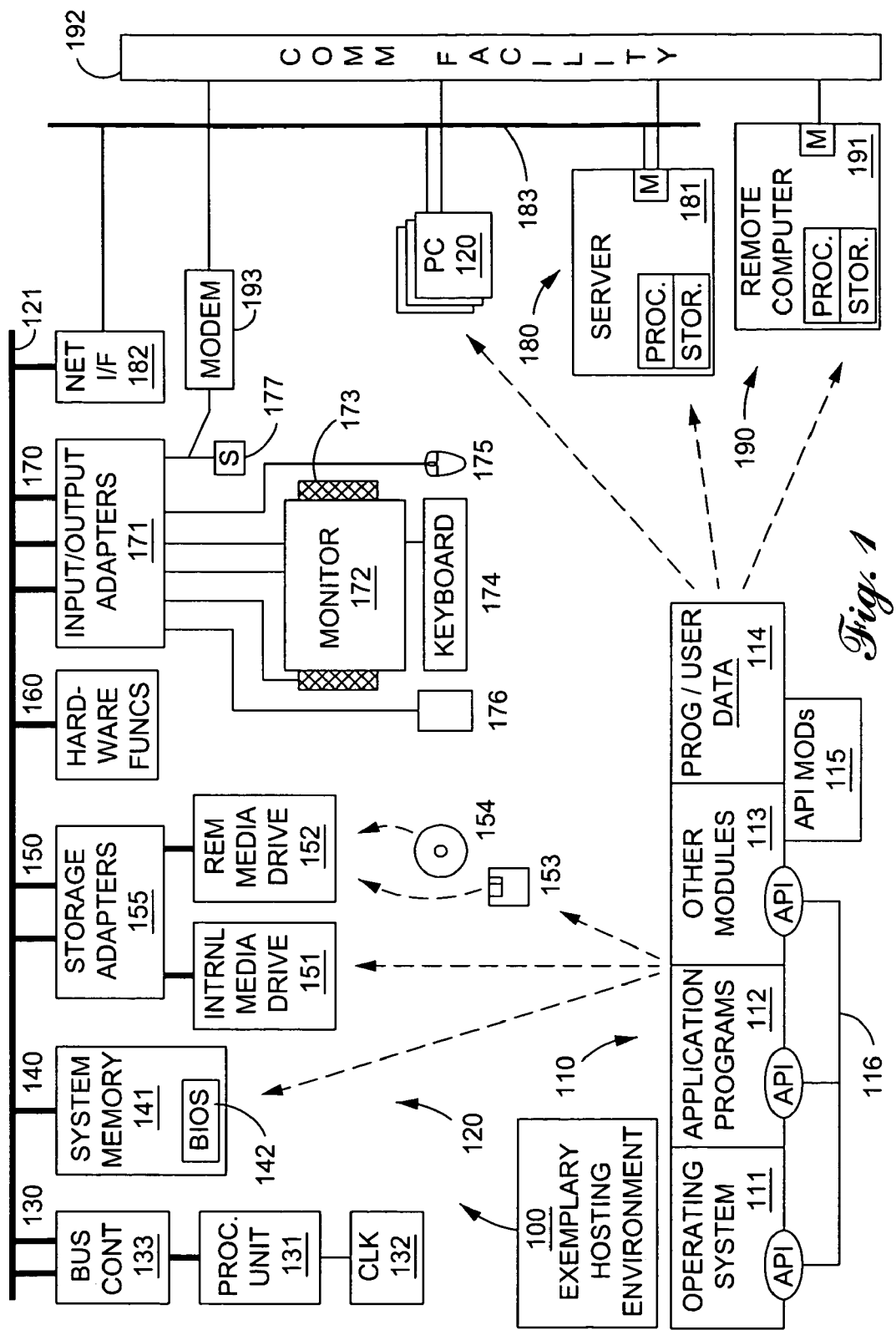
FIG. 1 is a block diagram of an exemplary environment for the invention.

FIG. 1 is a high-level diagram of an exemplary environment 100 having software 110 and hardware 120 for hosting the invention as executable instructions, data, and/or electronic and mechanical components. However, other suitable environments and variations of the described environment are also possible and within the scope of the invention.

Hardware components 120 are shown as a conventional personal computer (PC) including a number of components coupled together by one or more system buses 121 for carrying instructions, data, and control signals. These buses may assume a number of forms, such as the conventional ISA, PCI, and AGP buses. Some or all of the units coupled to a bus can act as a bus master for initiating transfers to other units. Processing unit 130 may have one or more microprocessors 131 driven by system clock 132 and coupled to one or more buses 121 by controllers 133. Internal memory system 140 supplies instructions and data to processing unit 130. High-speed RAM 141 stores any or all of the elements of software 110. ROM 142 commonly stores basic input/output system (BIOS) software for starting PC 120 and for controlling low-level operations among its components. Bulk storage subsystem 150 stores one or more elements of software 110. Hard disk drive 151 stores software 110 in a nonvolatile form. Drives 152 read and write software on removable media such as magnetic diskette 153 and optical disc 154. Other technologies for bulk storage are also known in the art. Adapters 155 couple the storage devices to system buses 121, and sometimes to each other directly. Other hardware units and adapters, indicated generally at 160, may perform specialized functions such as data encryption, signal processing, and the like, under the control of the processor or another unit on the buses.

Input/output (I/O) subsystem 170 has a number of specialized adapters 171 for connecting PC 120 to external devices for interfacing with a user. A monitor 172 creates a visual display of graphic data in any of several known forms. Speakers 173 output audio data that may arrive at an adapter 171 as digital wave samples, musical-instrument digital interface (MIDI) streams, or other formats. Keyboard 174 accepts keystrokes from the user. A mouse or other pointing device 175 indicates where a user action is to occur. Block 176 represents other input and/or output devices, such as a small camera or microphone for converting video and audio input signals into digital data. Other input and output devices, such as printers and scanners commonly connect to standardized ports 177. These ports include parallel, serial, SCSI, USB, Fire Wire, and other conventional forms.

Personal computers frequently connect to other computers in networks. For example, local area network (LAN) 180 connect PC 120 to other PCs 120' and/or to remote servers 181 through a network adapter 182 in PC 120, using a standard protocol such as Ethernet or token-ring. Although FIG. 1 shows a physical cable 183 for interconnecting the LAN, wireless, optical, and other technologies are also available. Other networks, such as wide-area network (WAN) 190 can also interconnect PCs 120 and 120', and even servers 181, to remote computers 191. Computers 181 and 191 have processors, storage, and communications equipment similar to those of PC 120, although usually of higher capacity. FIG. 1 illustrates a communications facility 192 such as a public switched telephone network for a WAN 190 such as an intranet or the Internet. PC 120 can employ an internal or external modem 193 coupled to serial port 177. Other technologies such as packet-switching ISDN, ATM, DSL, frame-relay are also available. In a networked or distributed-computing environment, some of the software 110 may be stored on the other peer PCs 120', or on computers 181 and 191, each of which has its own storage devices and media.

Software elements 110 may be divided into a number of types whose designations overlap to some degree. For example, the previously mentioned BIOS sometimes includes high-level routines or programs which might also be classified as part of an operating system (OS) in other settings. The major purpose of OS 111 is to provide a software environment for executing application programs 112 and for managing the resources of system 100. An OS such as Windows® or Windows NT® from Microsoft Corp. commonly includes high-level application-program interfaces (APIs), file systems, communications protocols, input/output data conversions, and other functions.

Application programs 112 perform more direct functions for the user. A user normally calls them explicitly, although they can execute implicitly in connection with other applications or by association with particular data files or types. Modules 113 are packages of executable instructions and data, which may perform functions for OSs 111 or for applications 112. Dynamic link libraries (DLL) and class definitions, for instance, supply functions to one or more programs.

Data 114 includes user data of all types, data generated and/or stored by programs, and digital data that third parties make available on media or by download for use in computer 120. Software elements can be embodied as representations of program instructions and data in a number of physical media, such as memory 140, non-volatile storage 150, and signals on buses 183, 192, and so forth.

2. Exemplary Search System Architecture

Figure 2:
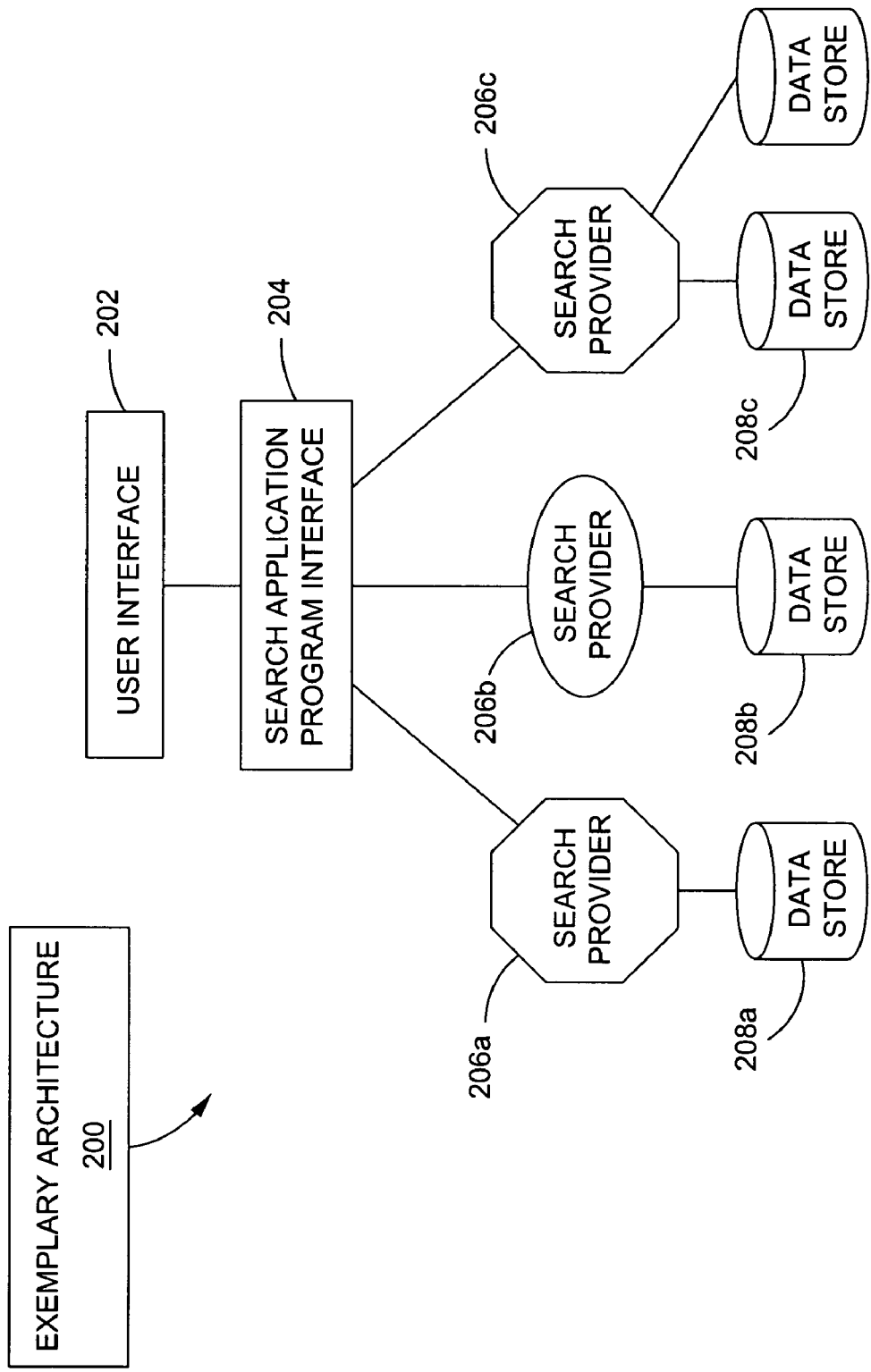
FIG. 2 is a block diagram of an exemplary search system or architecture 200 in accord with the invention.

FIG. 2 shows an exemplary search system or architecture 200 in accord with the present invention. Architecture 200 includes a graphical user interface 202, a search application program interface (API) 204, search providers 206a, 206b, and 206c, and data stores 208a, 208b, and 208c, which in the exemplary embodiment are implemented in C++ or COM. However, other embodiments implement the components as CORE A objects. Indeed, the invention is not limited to any particular form or class of implementations. In some embodiments, the data stores include one or more of the following types of data: files, folders, workspaces (akin to source-code-control (SCC) databases), bugs, problem reports, code defects, project tasks, test cases, test results, build scripts, build results, performance data, load/stress data, and in fact virtually anything related to software under development or the software development process itself.

In general, user interface 202 facilitates user definition of query structures and communication of these query structures to search API 204, which in turn communicates them to one or more of search providers 206a-206c. The search providers process the query structures and search one or more of data stores 208a-208c based on the query structures and return any search results to interface 202 via search API 204.

Figure 3:
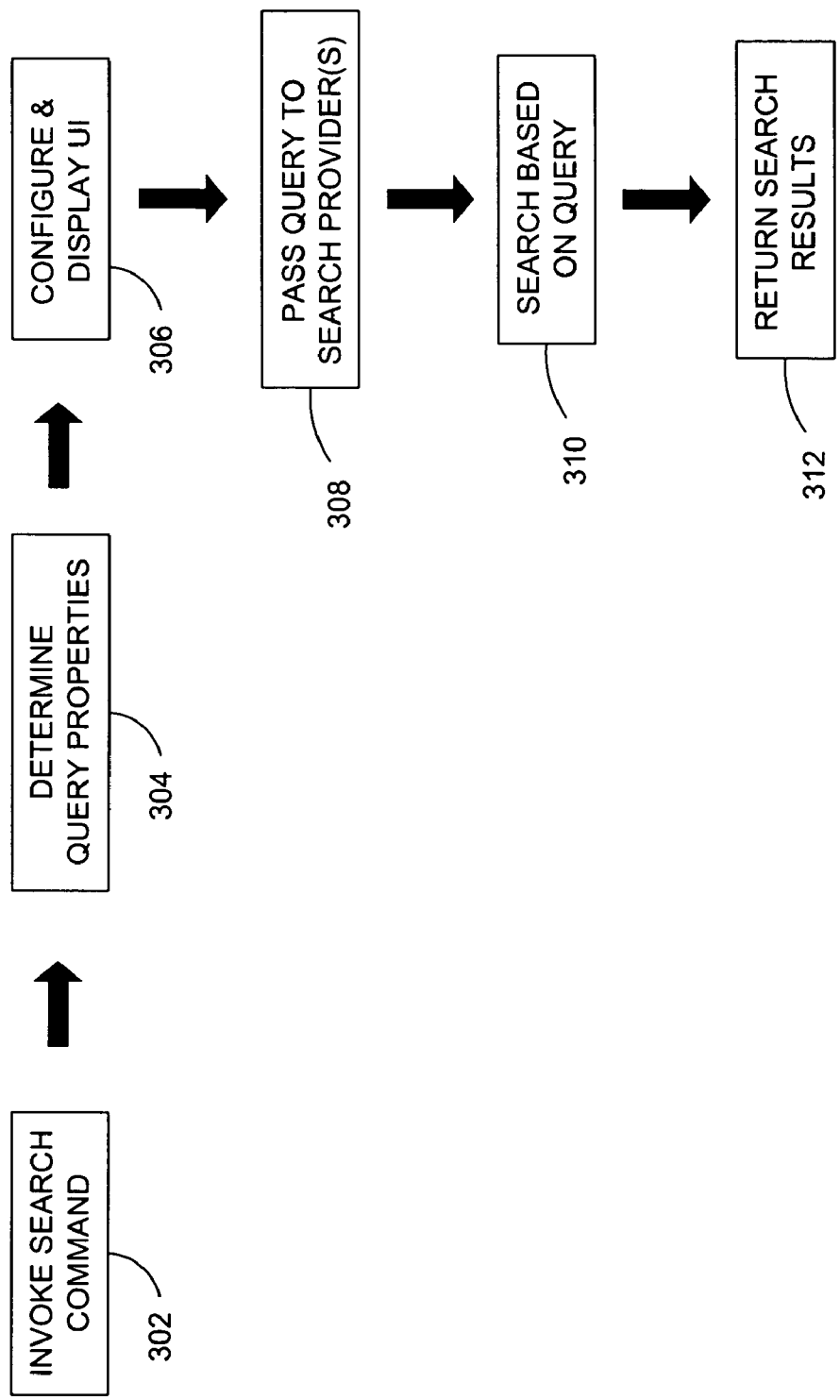
FIG. 3 is a flowchart of an exemplary method of operating a search system, such as system 200 in FIG. 2, in accord with the invention.

More particularly, FIG. 3 shows an exemplary flow chart 300 that provides further details of operating the exemplary search system in accord with the invention. Flow chart 300 includes blocks 302-312, which are arranged serially in the exemplary embodiment. However, other embodiments of the invention may execute two or more blocks in parallel using two or more independent machines, two or more processors, or a single processor organized as two or more virtual machines, subprocessors, threads, fibers, or other alternative techniques. Additionally, other embodiments reorder, combine, divide, and/or omit the functions associated with one or more of these exemplary blocks. Moreover, still other embodiments implement the blocks as two or more specific interconnected hardware modules with related control and data signals communicated between and through the modules. Thus, the exemplary process flow is applicable to not only software, but also firmware and hardware implementations.

In process block 302, a user or device invokes a search command, such as a "find command," indicating a desire to find and retrieve certain files or data within files. In some embodiments, the search command retrieves data in the form of data records, conceptual objects, or other desired logical forms. On invocation of the search command, search API 204 determines the query properties associated with one or more of the search providers to determine one or more query properties, as indicated in block 304.

In some embodiments, this determination entails interrogating one or more of the search providers, each of which responds with one or more sets of data describing one or more of their respective query properties. Other embodiments rely on one or more of the search providers to in effect register one or more of their query properties with API 204 or some other object or resource accessible to API 204 or interface 202. In one variant of this registration, at least one search provider registers one or more of its query properties as part of its installation into system 200 and API 204 refers to these registered properties. An exemplary set of query properties includes a list of one or more data property names, query comparison operators, and a number of operands for each of the comparison operators, syntactic data types and data value type for each operand. In some embodiments, the query properties also include localization information about display strings. After receiving one or more set of query properties from the search providers, execution continues at block 306.

Block 306 entails configuring and displaying (or otherwise manifesting) a user interface based at least in part on the set of query properties for one of the search providers. In the exemplary embodiment, this entails communicating one or more of the query properties for each of the search providers to the user interface.

Based on one or more of these properties, the system configures and displays a graphical user interface having an appropriate set of entry fields, drop-down menus, and/or other conventional mechanisms to facilitate articulation or definition of one or more queries using the particular query properties of one or more of the search providers. (FIGS. 4, 5, 6A, 6B, and 7, which are discussed below, show several exemplary search windows that are configured based on discovered query properties of the search providers.) After definition of a query, the query is passed from the user interface to search API 204, possibly in a textual form similar to a SQL query or in the form of an XML document, which then executes block 308. In the exemplary embodiment, the search providers communicate a list of one or more searchable fields for its associated data stores. Each field has optionally associated legal values and valid operators, and each operator has associated information indicating the number, style, and type of permissible operands. The searching service also provides APIs to convert between a query tree, a SQL-like representation, XML, and other possible embodiments.

Block 308 entails accepting the query and communicating it to one or more of the search providers. To this end, the exemplary embodiment forms a parse tree representative of the query and passes it by value or by reference to one or more of the search providers. Advantageously, the search provider doesn't need to parse SQL or XML. It has a structurally valid parse tree of the query. This makes query generation much simpler. In many embodiments that pass or call by reference, the search provider is responsible for copying the data and ensuring that the source data remains unmodified. In contrast, the "pass or call by value" approach allows providers to annotate and modify as necessary. This approach is desirable because it allows the provider to modify the parse tree during query formation, optimizing or transforming the tree for the target search facility.

In the exemplary embodiment, search API 204 marshals the parse tree to the search provider. Services are also available to allow the search provider to marshal the parse tree to other search providers, processes, or computers.

Unlike conventional search providers, one or more of the search providers in the exemplary embodiment do not require a parser. In some embodiments, at least one of the search providers includes a parser, which thereby allows sharing of any requisite parsing between search API 204 and the search provider. Some embodiments omit a parser altogether, relying on transfer of the query from API 204 to the search providers in some other form, such as an XML document.

After passing of the query, or more precisely some data structure representative of the query, to one of the search providers, the exemplary method of operation continues at block 310. In block 310, one or more of the search providers searches its associated data store 208a, 208b, or 208c based on the parse tree or other structure representing the user-defined query. In the exemplary embodiment, one or more of the search providers receiving the parse tree remaps the parse tree according to its query properties to facilitate an optimal search of its associated data stores. For example, a tuple such as CreationDate Between Date1, Date2, which identifies files (or more generally data objects) having a creation date between Date1 and Date2 inclusive, can be remapped to a combination tuple, such as CreationDate>=Date1 AND CreationDate<=Date 2. Though this example is quite simple, the principle of query transformation allows for remapping arbitrarily complex and abstract operators and queries according to the query grammar of any number of search providers.

Exemplary search providers expose query properties using "script name" and "display name." This allows the search providers to use locale-specific display names, while using locale-independent script names. Specifically, when an exemplary search provider generates a query from a parse tree, it uses the script name, but includes the display name as a column alias. Thus, the query tree points to structures that contain both the display name and the column alias, enabling the search provider to choose the best one for the task at hand. This is also integrated into the SQL-like language and can be integrated into other forms such as XML.

Related functionality in the exemplary embodiment allows for the hierarchical layering or serial chaining of the search providers to answer a query. Specifically, the exemplary embodiment allows hand off of a query (or equivalent parse tree or XML document) from provider 306c to provider 306b and provider 306b to provider 306a, with the effect of provider 306a fulfilling the query and the results reported back through provider 306c to the user interface via search API 204. This capacity to chain or layer search providers is without theoretical bound. After completion of the search, the results are returned as indicated in block 312. The exemplary embodiment returns results in the form of OLE DB rowsets. However, other embodiments return results as Active Data Object (ADO) recordsets (a wrapper around OLE DB) or in XML and XQL forms. Other embodiments use other data structures capable of holding multiple search results.

Figure 4:
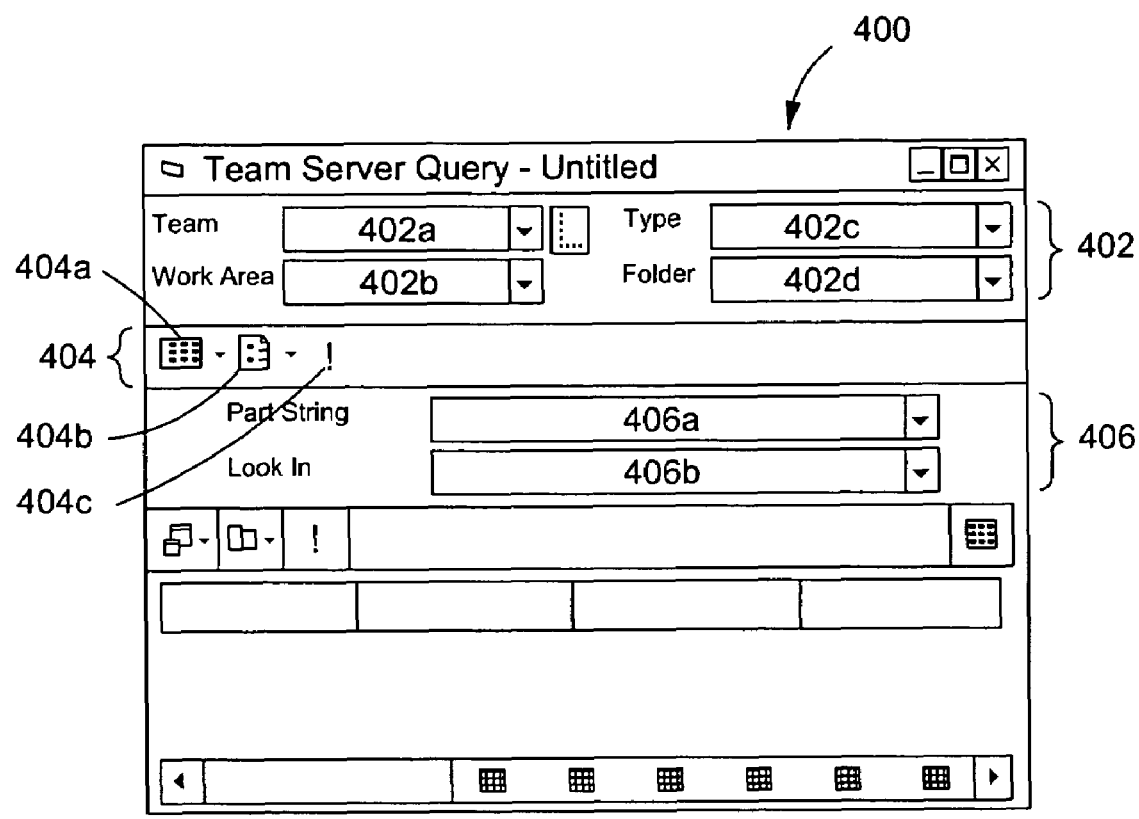
FIG. 4 is a facsimile of an exemplary simple query window 400 in accord with the invention.
Figure 5:
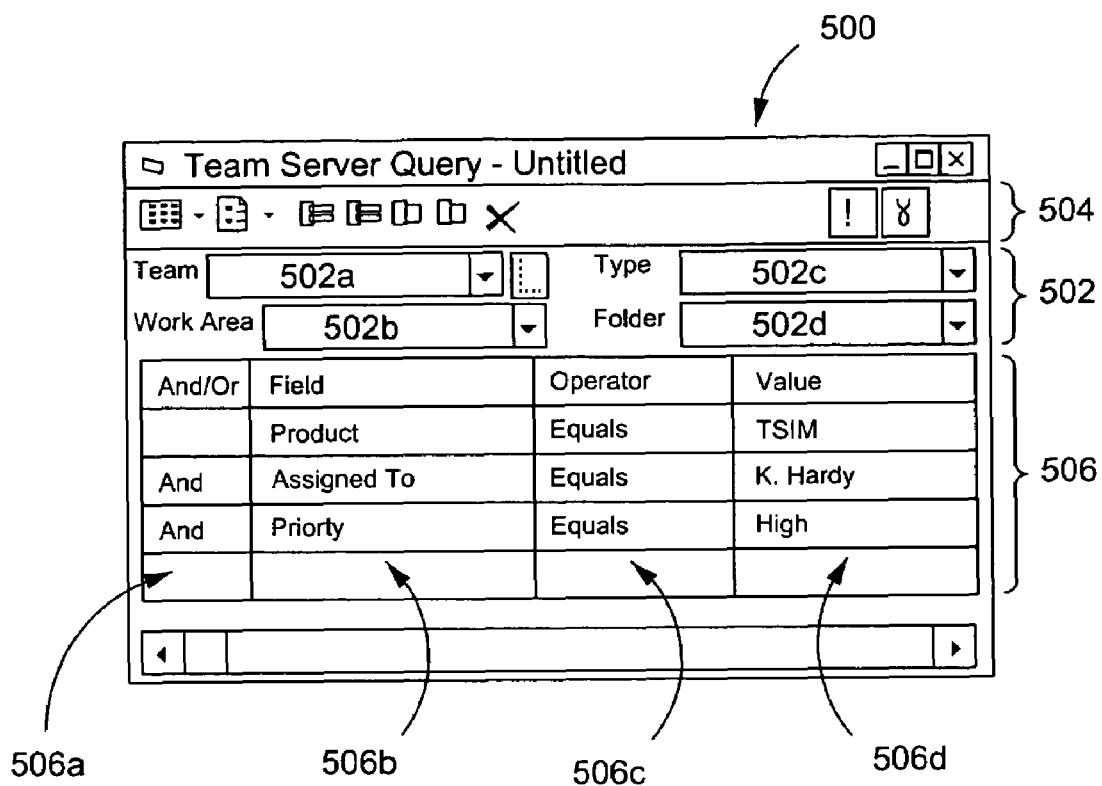
FIG. 5 is a facsimile of an exemplary advanced query window 500 in accord with the invention.

FIGS. 4, 5, 6 A, 6B, and 7 show three exemplary user-selectable types of query windows—simple, advanced, and graphical—which can be configured based on discovered query properties of one or more of search providers 206a-206c in FIG. 2. Unlike conventional user interfaces that allow searching through two or more search providers, the query windows of the present invention provide users with a consistent experience as they switch from one source provider to another. To achieve consistency across multiple search providers, each query window in the exemplary embodiment includes at least one set of one or more user entry fields which remains constant from one search provider to the next. In the exemplary embodiments, consistency manifest as a set of four fields which have similar placement within the query windows not only for each service provider, but also for each style or type of query window.

In particular, FIG. 4 shows an example of a simple query window 400, which includes regions or areas 402, 404, and 406. Region 402 includes input fields 402a, 402b, 402c, and 402d with associated pull-down menus (not shown). (Some embodiments omit the pull-down menus and infer options from context.) In this exemplary embodiment, field 402a accepts entry of one or more team identifiers; field 402b accepts entry of one or more work-area identifiers; field 402c accepts entry of one or more folder identifiers. These identifiers generally designate a set of one or more data stores and/or files to be searched. In the exemplary embodiment, TEAM indicates an input area for identifying one or more servers or data spaces associated with one or more design or development teams. TYPE indicates an input area for identifying the type or types of objects or data to search; WORK AREA indicates an input area for identifying one or more information collections to search; and FOLDER indicates an input area for further identifying the desired search scope within an identified WORK AREA. Adjacent to region 402 is region 404. The exemplary embodiment reserves region 404 for interface commands. In the exemplary embodiment, one or more of the search providers communicate icons such as icons 404a, 404b, and 404c for association with region 404. Each icon has a meaning determined by the search providers and generally indicates the type of information being searched. This embodiment demonstrates searching a single data type (for example, file or bug) per search. However, other embodiments could allow searching across two or more types.

Region 406 includes input fields 406a and 406b, each having an associated pull-down menu. Region 406a accepts entry of a find string, and region 406b accepts entry of one or more look-in identifiers. The look-identifiers generally identify corresponding search spaces within one or more associated databases. FIG. 5 shows an example of an exemplary advanced query window 500, which includes a region 502, a region 504, and a region 506. Region 502, like region 402 in FIG. 4, includes input fields 502a, 502b, 502c, and 502d with associated pull-down menus (not shown). Region 504 includes a number of interface commands. Region 506 allows users to define or enter one or more name-relationship-value expressions (or tuples) identifying desired data attributes. More precisely, region 506 includes an "and-or" combination column 506a, a name or field column 506b, and one or more value columns 506d. In general, columns 506b, 506c, and 506d define one or more name-relationship-value tuples. For more than one tuple (or row), column 504a includes a logical operation (such as "and," "or," or "not") which defines the logical relationship of the tuples. For example, the ordered expression "Product Equals TSIM" in the first row of region 506 identifies data having an associated Product identifier string "TSIM." The "And's" in the second and third row of column 506a indicate that the desired data also must satisfy the expressions "Assign_To Equals "KHardy" and Priority Equals "High."

Figure 6A:
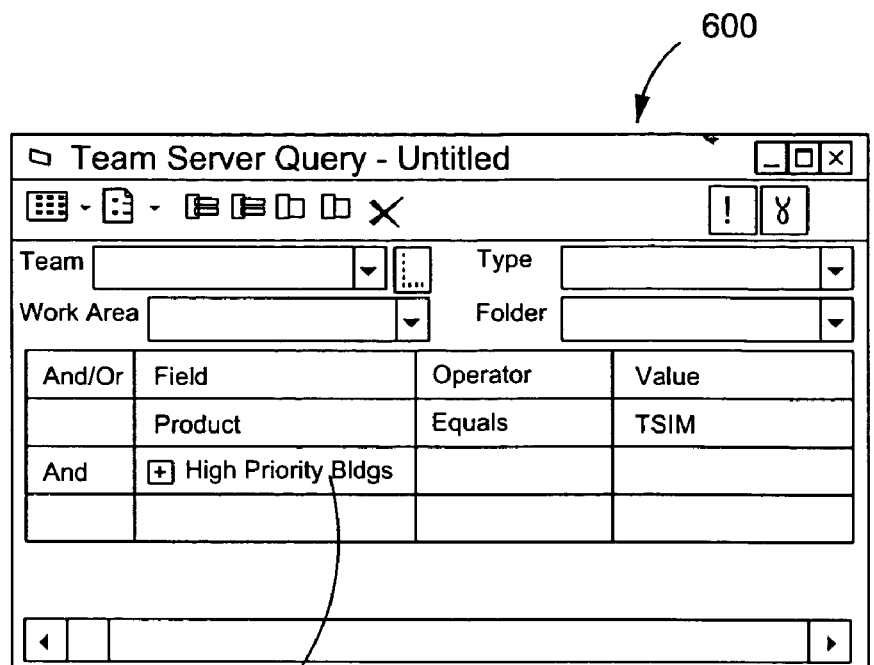
FIG. 6A is a facsimile of an exemplary query window 600, which is a variation of the window 500 in FIG. 5.
Figure 6B:
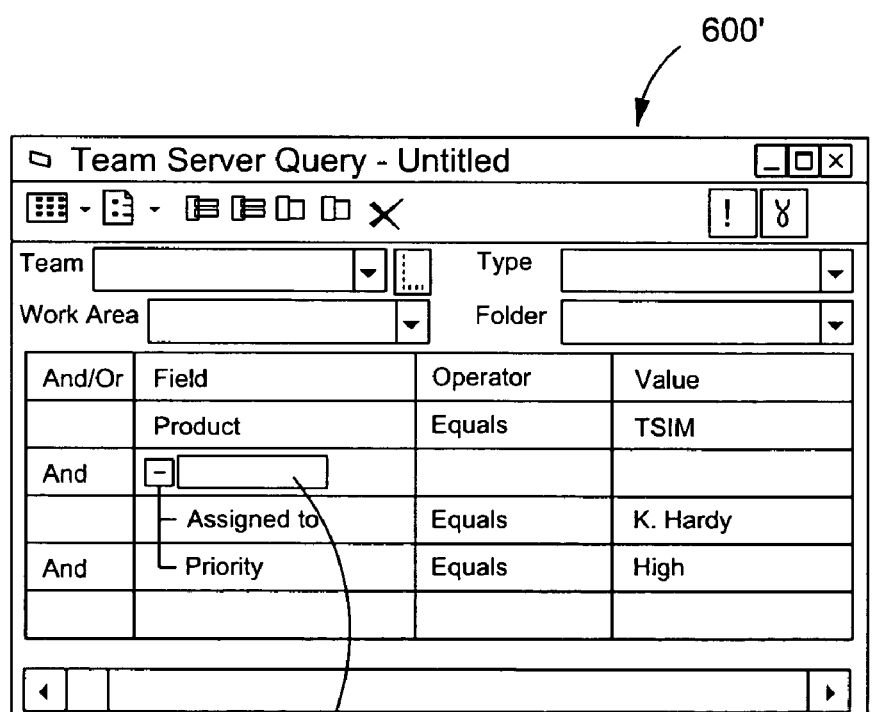
FIG. 6B is a facsimile of an exemplary query window 600', which is a variation of window 600 in FIG. 6A.

FIGS. 6 A and 6B show two related variations of window 600. In particular, FIG. 6 A shows an advanced query window 600 which includes an alias 602 for a tuple or other query structure. Alias 600 is in effect a proxy for a predefined tuple or combination of tuples. FIG. 6B shows window 600 after a user had clicked or otherwise selected to display the tuple underlying alias 602. The exemplary embodiment supports use of one or more aliases in a single query window. (Note that the grouping and hierarchical display are independent of the actual search provider and illustrate how canonical elements can be optimized using shared user-interface techniques.)

Relatedly, the exemplary embodiment also facilitates a user identifying and persisting a tuple or combination of tuples as an alias for future use. Moreover, it also allows communicating the alias and its underlying query structure to other users via electronic mail and/or persisting them to a repository for reuse by others. In persisting the query structure, a user has the option to associate with the query a projection list (which identifies the form of the results), ordering information (for example, sort by size, date, etc), search provider, user-interface format parameters (such as, column widths, column ordering, and so forth.

Figure 7:
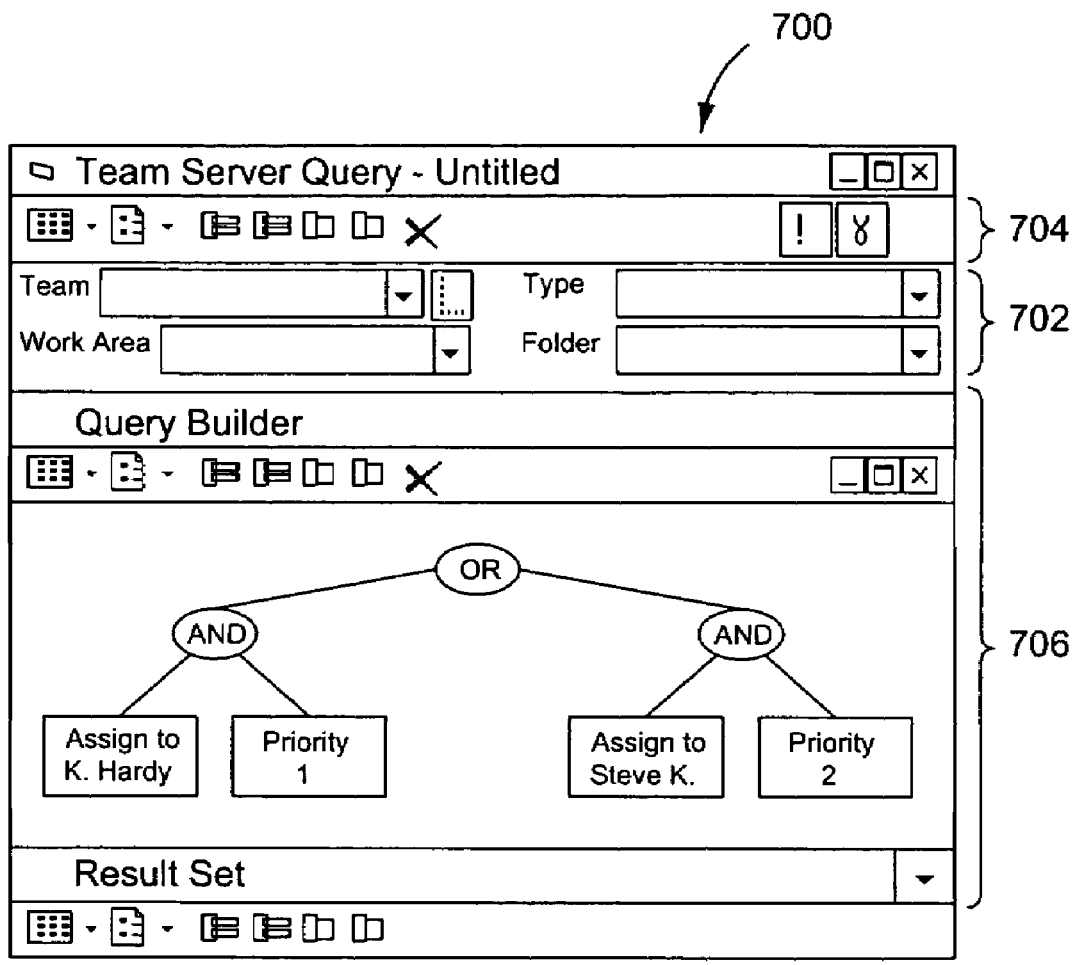
FIG. 7 is a facsimile of an exemplary graphical or pictorial query window 700, also in accord with the present invention.

FIG. 7 shows a graphical query window 700 that allows a user to define a query pictorially or to view a previously defined query as a graph. Window 700 includes a region 702, a region 704, and a region 706, which are analogous to the regions in the other windows. Region 706 includes a structured query diagram noting the conditions (tuples) and groupings. Users can select items or groups of items and create new groupings. Also, new conditions can be added to the diagram using main or context menus. The exemplary embodiment supports in-place editing of the diagram.

One particularly useful feature of user interface 202 and its provision of query windows such as those shown in FIGS. 4, 5, and 7, is the ability for a user to define all or part of a query in one style or type and to switch from one query window style to another, thereby gaining alternative views of the query structure. For example, a user could begin defining a complex query in an advanced query window, such as window 500 in FIG. 5, and then switch, with the click of a mouse, to a graphical query window, such as window 700 in FIG. 7, of the same query in a query diagram. Some embodiments indicate to the user when conversion from one query view to another is not logically feasible.

Some embodiments of the invention support side-by-side parallel use of any combination of two of the three query window forms. Thus, as one builds a query in one form of query window, such as the advanced query window, an equivalent query structure manifests in another form of query window, such as the graphical query window, allowing a user to more readily switch back and forth between the two query windows. Additionally, the exemplary embodiments supports component copying and moving using "cut" and "paste" features. The copying and moving functions across different search windows and across different user interfaces. For example, a set of elements in a graphical query can be selected and pasted into the advanced grid and the result will be a grid representation of the graphical query.

CONCLUSION

In furtherance of the art, the present inventors have devised an extensible and adaptively configurable user interface to facilitate a common user experience across two or more data classes and an extensible common query structure to allow expansion of a query language to meet the demands of new data classes. The exemplary embodiment includes a discovery mechanism for determining one or more query properties, such as object properties, query operators, and operands, of one or more search providers. The discovery mechanism supports adaptive reconfiguration of a user interface to expose the query properties of the search providers. The exemplary user interface includes first and second regions, with the first region having a set of input fields, which remains substantially constant over a set of two or more search providers, and the second region adaptive to the query properties of a select search provider. Other notable functionality includes transfer (via email, for example) of queries or partial queries to other users, and storage of queries or partial queries in a team repository for reuse.

The embodiments described above are intended only to illustrate and teach one or more ways of practicing or implementing the present invention, not to restrict its breadth or scope. Only the following claims and their equivalents define the actual scope of the invention, which embraces all ways of practicing or implementing the concepts of the invention.

The invention claimed is:

1. A method of operating a system to perform a search, the method comprising:
   receiving information from a plurality of search providers directed to query language features supported by the respective search providers;
   identifying common query language features common to all of the plurality of search providers;
   transmitting the common query language features to a user interface;
   receiving user input through the user interface to define a query for execution by the search providers based on the common query language features;
   parsing the query to define a single common parse tree that is transformable by each of the respective search providers based on the query language features supported by each of the respective search providers;
   passing the single common parse tree to at least one of the search providers to enable execution of the query by the search providers;
   executing the query by at least one of the search providers;
   receiving results for the executed query from at least one of the search providers; and
   displaying the results.

2. The method of claim 1, wherein the information received from at least one of the search providers is at least one member of a group comprising data property names, query comparison operators, data object properties, operands for each of the comparison operators, syntactic data types, data value types, or localization information about display strings.

3. The method of claim 1, wherein passing the single common parse tree to at least one of the search providers comprises passing the parse tree by value to one of the search providers.

4. The method of claim 1, further comprising electronically transferring at least a portion of the query to one or more other users.

5. The method of claim 1, further comprising copying at least a portion of the query to a repository for use by other users.

6. A system comprising:
   a graphical user interface having input fields for defining a query;
   means for interrogating and receiving information indicating query language features supported by a plurality of search providers;
   means for identifying common query language features common to all of the plurality of search providers;
   means for transmitting the common query language features to the user interface;
   means for receiving user input through the user interface to define a query for execution by the search providers based on the common query language features;
   means for parsing the query to define a single common parse tree that is transformable by each of the search providers based on the query language features supported by each of the respective search providers;
   means for passing the single common parse tree to at least one of the search providers to enable execution of the query by the search providers;
   means for executing the query by at least one of the search providers;
   means for receiving results for the executed query from at least one of the search providers; and
   means for displaying the results.

7. The system of claim 6, wherein the information received from at least one of the search providers is at least one member of a group comprising data property names, query comparison operators, data object properties, operands for each of the comparison operators, syntactic data types, data value types, or localization information about display strings.

8. A computer-readable medium having computer-executable instructions for performing steps comprising:
   receiving information from a plurality of search providers directed to query language features supported by the respective search providers;
   identifying common query language features common to all of the plurality of search providers;
   transmitting the common query language features to a user interface;
   receiving user input through the user interface to define a query for execution by the search providers based on the common query language features;
   parsing the query to define a single common parse tree that is transformable by each of the respective search providers based on the query language features supported by each of the respective search providers;
   passing the single common parse tree to at least one of the search providers to enable execution of the query by the search providers;
   executing the query by at least one of the search providers;
   receiving results for the executed query from the search providers; and
   displaying the results.

9. The computer-readable medium of claim 8, wherein the information received from at least one of the search providers is at least one member of a group comprising data property names, query comparison operators, data object properties, operands for each of the comparison operators, syntactic data types, data value types, or localization information about display strings.

10. The computer-readable medium of claim 8, wherein passing the single common parse tree to at least one of the search providers comprises passing the parse tree by value to one of the search providers.

11. The computer-readable medium of claim 8, having further computer-executable instructions for performing the step of electronically transferring at least a portion of the query to one or more other users.

12. The method of claim 8, having further computer-executable instructions for performing the step of copying at least a portion of the query to a repository for use by other users.

13. A method of operating a system to perform a search, the method comprising:
   receiving information from a plurality of search providers directed to query language features supported by each of the plurality of search providers;

identifying common query language features common to all of the plurality of search providers;
providing a user interface comprising a single common set of query input fields generated based on the common query language features supported by all of the plurality of search providers;
receiving user input through the user interface to define a query for execution by the search providers;
parsing the query to define at least one parse tree that is transformable by at least one of the search providers;
passing the at least one parse tree to at least one of the search providers to enable execution of the query by at least one of the search providers;
executing the query by the at least one of the search providers;
receiving results for the executed query from at least one of the search providers; and
displaying the results.

14. The method of claim 13, wherein the information received from the search providers is at least one member of a group comprising data property names, query comparison operators, data object properties, operands for each of the comparison operators, syntactic data types, data value types, or localization information about display strings.

15. The method of claim 13, wherein passing the at least one parse tree to at least one of the search providers comprises passing the parse tree by value to one of the search providers.

16. The method of claim 13, further comprising electronically transferring at least a portion of the query to one or more other users.

17. The method of claim 13, further comprising copying at least a portion of the query to a repository for use by other users.

18. A system comprising:
a graphical user interface comprising a single common set of query input fields generated based on common query language features supported by all of a plurality of search providers;
means for receiving information from the plurality of search providers directed to the different query language features supported by each of the search providers;
means for identifying the common query language features common to all of the plurality of search providers;
means for providing the user interface based on the information received from the search providers;
means for receiving user input through the user interface to define a query for execution by the search providers;
means for parsing the query to define at least one parse tree that is transformable by at least one of the search providers;
means for passing the at least one parse tree to at least one of the search providers to enable execution of the query by at least one of the search providers;
means for executing the query by the at least one of the search providers;
means for receiving results for the executed query from at least one of the search providers; and
means for displaying the results.

19. The system of claim 18, wherein the information received from the search providers is at least one member of a group comprising data property names, query comparison operators, data object properties, operands for each of the comparison operators, syntactic data types, data value types, or localization information about display strings.

20. A computer-readable medium having computer-executable instructions for performing steps comprising:
receiving information from a plurality of search providers directed to query language features supported by each of the plurality of search providers;
identifying common query language features common to all of the plurality of search providers;
providing a user interface comprising a single common set of query input fields generated based on the common query language features supported by all of the plurality of search providers;
receiving user input through the user interface to define a query for execution by the search providers;
parsing the query to define at least one parse tree that is transformable by at least one of the search providers;
passing the at least one parse tree to at least one of the search providers to enable execution of the query by at least one of the search providers;
executing the query by the at least one of the search providers;
receiving results for the executed query from at least one of the search providers; and
displaying the results.

21. The computer-readable medium of claim 20, wherein the information received from the search providers is at least one member of a group comprising data property names, query comparison operators, data object properties, operands for each of the comparison operators, syntactic data types, data value types, or localization information about display strings.

22. The computer-readable medium of claim 20, wherein passing the at least one parse tree to at least one of the search providers comprises passing the parse tree by value to one of the search providers.

23. The computer-readable medium of claim 20, having further computer-executable instructions for performing the step of electronically transferring at least a portion of the query to one or more other users.

24. The computer-readable medium of claim 20, having further computer-executable instructions for performing the step of copying at least a portion of the query to a repository for use by other users.

* * * * *